L. C. DUTRO.
OIL CUP.
APPLICATION FILED FEB. 9, 1921.
1,408,181.
Patented Feb. 28, 1922.
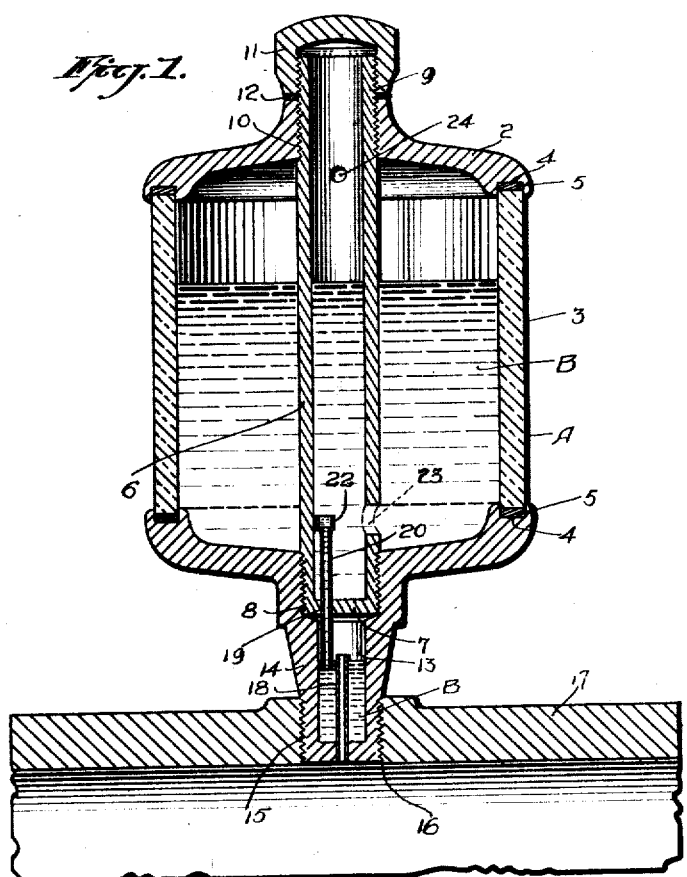
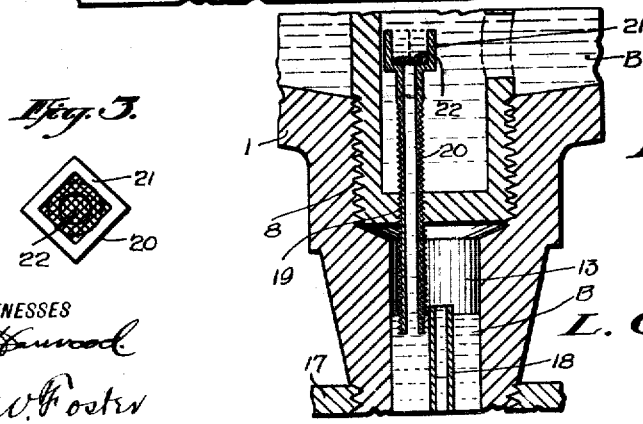
WITNESSES
INVENTOR
L. C. DUTRO.
BY
ATTORNEYS

UNITED STATES PATENT OFFICE.

LESLIE C. DUTRO, OF LONG BEACH, CALIFORNIA.

OIL CUP.

1,408,181.

Specification of Letters Patent. Patented Feb. 28, 1922.

Application filed February 9, 1921. Serial No. 443,658.

*To all whom it may concern:*

Be it known that I, LESLIE C. DUTRO, a citizen of the United States, and a resident of Long Beach, in the county of Los Angeles and State of California, have invented a new and Improved Oil Cup, of which the following is a full, clear, and exact description.

This invention relates to improvements in oil cups, and more particularly to an oil cup having an automatic feed of oil controlled by the temperature of the bearing, which temperature is imparted to the cup and the lubricant therein.

A further object is to improve upon the construction set forth in my pending application for patent on oil cups, filed October 5, 1920, and given Serial No. 414,820.

With these and other objects in view the invention consists in certain novel features of construction, and combinations and arrangements of parts as will be more fully hereinafter described and pointed out in the claims.

In the accompanying drawings—

Figure 1 is a view in longitudinal section illustrating my improved oil cup in position with relation to a bearing.

Figure 2 is an enlarged sectional view through the lower portion of the cup.

Figure 3 is an end view of the tube 20.

A represents my improved cup which constitutes a base 1, a top 2 and a cylindrical or other shaped casing 3. The base and top 2 are preferably of metal and the casing 3 is preferably of glass or other transparent material. The base 1 and top or cap 2 are made with grooves 4 for the reception of the ends of the casing 3 and gaskets 5 are located in the grooves 4 so as to form a tight juncture of the parts. The parts of the cup are secured together by means of a relatively large tube 6, which I shall hereinafter term a "filler tube."

This tube 6 is screw threaded at both ends and at its lower closed end 7 is screwed into a threaded socket 8 in the base 1. The upper screw threaded end 9 of tube 6 is projected through a screw threaded opening 10 in the top 2 and projects above said top and is adapted to receive an internally screw threaded cap 11 to close the upper end of the tube and a gasket 12 is preferably interposed between the cap and the top 2 to make an airtight joint.

The base 1 below the socket 8 receiving the lower end of the tube 6 is made with a well 13 and this well is formed in an extension 14 of the base, which extension is screw threaded as shown at 15, and adapted to fit within the threaded opening 16 in a bearing 17. A relatively small oil feed tube 18 is secured at its lower end in an opening in the end of extension 14 and projects up into the well 13 the desired distance. The lower end of the filler tube 6 is made with a screw threaded opening 19 for the reception of an externally screw threaded connecting tube 20. This connecting tube 20 is projected into the well 13 the desired distance and at its upper end is made with a wrench receiving socket 21 and provided with a screen 22.

The filler tube 6 is provided near its lower end with an opening 23 through which the oil flows from the cup into the tube and near its upper end said tube 6 is made with an opening 24 for the passage of air.

The operation of my improved oil cup, which is entirely automatic, is as follows: When the cup is filled or partially filled with lubricant, which filling operation can be performed by removing the cap 11 and inserting the lubricant through the tube 6, a portion of said lubricant will flow into the well 13, but due to the fact that the cup is airtight, the escape of oil from the cup will cause a partial vacuum to be formed in the upper portion thereof so that the flow of oil will cease under normal conditions.

The height of oil in the well 13 is controlled by the position of the tube 20 as the lower end of said tube being submerged in the oil will constitute a trap and the upper portion of the well is open to the air from the bearing through the tube 18.

When the temperature of the bearing increases, the heat will be transmitted to the well, cup, and lubricant, to cause the expansion of the lubricant and also the expansion of the air within the cup. This expansion will force the lubricant downwardly through the tube 20 into the bearing to cool the latter. As the temperature decreases the expansion of fluid will decrease and if this decrease in temperature is sufficient, the lubricant will be sucked up from the well 13 through the tube 20 and air will be drawn from the bearing through the tube 18 into the well.

The tube 20 can be longitudinally adjusted by means of a socket wrench inserted through the upper end of the tube 6 after the cap 11 is removed, and it will be understood that the feed of lubricant will be rendered more or less sensitive in accordance with the adjustment of this tube 20. When the tube 20 is lowered, the feed of oil will be less and when the tube is elevated, the feed will be more sensitive, so that the operator can render the feed as sensitive as desired.

The opening 24 in the tube 6 allows air to flow from the tube into the cup and vice versa, and also prevents a complete filling of the cup as an air pocket will be formed in the upper end of the cup when the lubricant reaches the level of the opening 24, and hence, insure a sufficient quantity of air in the cup to perform the necessary functions as described.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A device of the character stated, comprising a base, a top, a casing, a filler tube having screw threaded engagement with the top and the base and coupling the said parts together, a well formed in the base below the lower end of the tube, an outlet tube extending upwardly into the well, and a tube adjustable in the lower end of the first-mentioned tube and connecting the interior of the cup with the well.

2. A device of the character stated, comprising a base, a top, a casing, a filler tube having screw threaded engagement with the top and the base and coupling the said parts together, a well formed in the base below the lower end of the tube, an outlet tube extending upwardly into the well, and a tube adjustable in the lower end of the first-mentioned tube and connecting the interior of the cup with the well, said first-mentioned tube having an oil opening near its lower end and an air opening near its upper end.

3. A device of the character stated, comprising a base, a top, a casing, a filler tube having screw threaded engagement with the top and the base and coupling the said parts together, a well formed in the base below the lower end of the tube, an outlet tube extending upwardly into the well, a tube adjustable in the lower end of the first-mentioned tube and connecting the interior of the cup with the well, said first-mentioned tube extending above the top, and a cap removably screwed on the upper end of said filler tube.

4. A device of the character stated, comprising a base, a top, a casing, a filler tube having screw threaded engagement with the top and the base and coupling the said parts together, a well formed in the base below the lower end of the tube, an outlet tube extending upwardly into the well, a tube adjustable in the lower end of the first-mentioned tube and connecting the interior of the cup with the well, said first-mentioned tube having an oil opening near its lower end and an air opening near its upper end, said first-mentioned tube extending above the top, and a cap removably screwed on the upper end of said filler tube.

5. A device of the character stated, comprising a cup, a well below the cup, an outlet tube at the lower end of the well projecting upwardly into the well, an externally screw threaded supply tube located in the lower end of the cup and connecting the well with the cup, said last-mentioned tube having a wrench receiving socket at its upper end, and a screen in said socket.

LESLIE C. DUTRO.